United States Patent [19]

Kirk et al.

[11] Patent Number: 5,129,037

[45] Date of Patent: Jul. 7, 1992

[54] NEURAL NETWORK FOR PERFORMING BETA-TOKEN PARTITIONING IN A RETE NETWORK

[75] Inventors: Steven A. Kirk, Natick; William S. Yerazunis, Hudson; William Barabash, Acton, all of Mass.

[73] Assignee: Digital Equipment Corporation, Maynard, Mass.

[21] Appl. No.: 368,777

[22] Filed: Jun. 20, 1989

[51] Int. Cl.$^5$ .............................................. G06F 15/18
[52] U.S. Cl. ....................................... 395/22; 395/64; 395/11
[58] Field of Search .................... 364/513; 395/11, 22, 395/64

[56] References Cited

U.S. PATENT DOCUMENTS 4,752,890  6/1988  Natarajaw et al. ................. 364/513
4,761,746  8/1988  Tano et al. .......................... 364/513

OTHER PUBLICATIONS

Lee et al., "A Parallel Architecture for AI Nonlinear Planning", *Tools For Artificial Intelligence TAI 89*, pp. 51-58 Oct. 22-25, 1989.
Hillyer et al., "Execution Of OPS5 Production Systems on a Massively Parallel Machine", Journal of Parallel And Distributed Computing 3, 236-268 (1986).
Shakley et al., "Real-Time Expert Systems For Control Using Parallel Processors", *Proc. 27th Conference on Decision and Control*, Dec. 1988 pp. 143-145.
Hwang et al., "A Parallel Architecture for Large Scale Production Systems", *Tools For Artificial Intelligence TAI 89*, Oct. 23-25, 1989 pp. 27-33.
Wah et al., "A Survey on the Design of Multiprocessing Systems for Artificial Intelligence Applications", *IEEE Trans. on Sys. Man. and Cpy.*, vol. 19, No. 4 Jul./Aug. 1989 pp. 667-692.
Moldovan, "Rubic: A Multiprocessor for Rule-Based Systems", *IEEE Trans. on Systems, Man and Cybernetics*, vol. 19 No. 4 Jul./Aug. 1989 pp. 699-706.
Parson et al., "Constant-Time Pattern Matching For Real-Time Production Systems", SPIE vol. 1095 *Applications of Artificial Intelligence* V11 (1989) pp. 971-982.
Lee et al. "Resource-Oriented Parallel Planning", *Tools For Artificial Intelligence TAI 89*, Oct. 23-25, 1989.
D. Tank, et al., "Collective Computation in Neuronlike Circuits", Scientific American, Dec., 1987, pp. 104-114.
Y. Abu-Mostafa, et al., "Optical Neural Computers", Scientific American, Mar., 1987, pp. 88-95.
R. Lippman, "An Introduction to Computing with Neural Nets", I.E.E.E. ASSP Magazine, Apr., 1987, pp. 4-22.
D. Rumelhart, et al., Parallel Distributed Processing, MIT Press, 1986, table of contents only.
C. Mead, *Analog VLSI And Neural Systems*, Addison-Wesley, 1989, table of contents only.
U.S. application Ser. No. 103,364, by W. S. Barabash et al., entitled "Method for Operating A Parallel System and Related Apparatus".
U.S. application Ser. No. 07/364,021, by W. S. Barabash et al., entitled "Expert System for Performing Beta-Token Partitioning in a RETE Network".

*Primary Examiner*—Allen R. Macdonald
*Attorney, Agent, or Firm*—Kenyon & Kenyon

[57] ABSTRACT

A method and system for beta-token partitioning a target expert system program. The target expert system program is first compiled to form a RETE network for execution on a single processor, the compilation including directives for collecting selected processing statistics. The target expert system program is then executed on a single processor, generating during execution processing statistics in connection with each node of the RETE network. The processing statistics are then applied to a programmed neural network to identify nodes in the RETE network for beta-token partitioning, and the target expert system program is then recompiled to form a RETE network for execution on multiple processors, the RETE network being beta-token partitioned at nodes identified by the neural network.

16 Claims, 5 Drawing Sheets

FIG. 3A-1
LEARN PHASE

FIG. 3A-2

FIG. 3B
OPERATE PHASE

NEURAL NETWORK FOR PERFORMING BETA-TOKEN PARTITIONING IN A RETE NETWORK

INCORPORATION BY REFERENCE

U.S. patent application Ser. No. 103,364, filed Sept. 30, 1987, in the names of William Barabash and William S. Yerazunis, for Method For Operating A Parallel Processing System And Related Apparatus, now U.S. Pat. No. 4,965,882, expressly incorporated herein by reference.

U.S. patent application Ser. No. 364,021, filed on June 8, 1989, in the names of William Barabash and William S. Yerazunis, for Expert System for Performing Beta-token Partitioning In A Rete Network.

FIELD OF THE INVENTION

Rule-based artificial intelligence systems, generally known as expert systems, typically include a set of rules, forming a "knowledge base", one or more facts in a working memory, and an inference engine that manipulates the rules in response to the facts in the working memory. By a process known as "inference", the inference engine attempts to match conditions in each of the rules to the facts in the working memory. If the conditions of a particular rule match the facts, the rule is said to "fire", and the inference engine then performs actions or operations specified in the rule. These operations may include, for example, addition, deletion and/or modification of facts in the working memory, transmission of results to a user, and so forth. The condition matching/firing sequence is sometimes referred to as a "recognize/act" cycle, with "recognize" referring to the portion of the operation in which the inference engine compares conditions of the rules to the facts in working memory to determine which, if any, rules fire, and "act" referring to the portion of the operation in which the inference engine actually performs the actions and operations specified in the rule. If, during firing of a rule, the inference engine adds, deletes or modifies a fact, the inference engine may repeat these operations in response to the new or modified facts in the working memory, which may, in turn, cause other rules to fire. Rule processing begins when an addition, modification or deletion is made to the facts in the working memory, and proceeds iteratively until no further additions, modifications or deletions are made to the facts in the working memory.

More particularly, each rule includes one or more conditions, which are collectively referred to as the "left-hand side", and a "right-hand side" which contains an action list, which identifies one or more operations performed if the rule fires. The facts in the working memory are typically organized as one or more relations, with each relation comprising one or more entries, or items of data. Each entry in a relation, in turn, is identified as having one or more slots. Each relation is identified by a class name, and each slot is identified by a slot name. A condition identifies a relation by class name, one or more slots, by name, and, optionally, a set of limits or requirements on the values for each named slot. In the comparison operation, the inference engine determines whether the relation in the working memory that corresponds to the class name in the condition contains an entry whose slot values correspond to the slot values set forth in the condition. If so, the condition is satisfied. However, if working memory does not have an entry whose slots contain the values specified in the condition, the condition is not satisfied. To determine whether a rule is in condition to fire, the inference engine performs the existence test in connection with each condition in the rule.

The existence test can be somewhat more complicated, particularly in connection with a rule in which one or more of a condition's slot values are expressed as variable values. If a condition identifies a class and one or more slot values, at least one of which is specified by a variable, and the values identified for each of the other slot names match the values in their corresponding slots in the working memory entry, the condition is satisfied by each entry in the relation identified by the class name in which the variable is satisfied. In the match operation for a condition with a variable, the inference engine establishes one or more binding lists for the variables that identify the set of values in the slots in the various entries in the relation which can satisfy the condition. The values of the variables in each binding list are propagated through subsequent conditions comprising the rule's left hand side to determine whether each successive condition is satisfied, with each set of values comprising the binding lists that satisfy the rule resulting in a different instantiation of the rule. The inference engine may then perform a conflict resolution operation among the rules and instantiations to select a rule, and specifically an instantiation if the rule has multiple instantiations, for firing.

One way in which the inference engine may determine if the rules' conditions are satisfied is to test each of the conditions of each of the rules against the facts in the working memory and keep track of the rules whose conditions are satisfied. However, in many circumstances the same condition is included in a number of rules. Further, in most circumstances, it is not necessary to evaluate every working memory relation against every rule during every recognize/act cycle. Instead, partial lists of relation/rule associations can be maintained and incremental updates performed to these lists as relations are added, deleted or modified. To avoid the necessity of testing or retesting such conditions for each rule, reticular, or "RETE" networks have been developed. In a reticular network, the conditions of all the rules are organized as a series of test nodes, with one test node being associated with each condition. Each of the rules, in turn, is represented by a terminal node. The test nodes are connected to the terminal nodes through a network of join nodes, each of which represents a logical operation in connection with each successive condition in the rule. During the "recognize" portion of the recognize/act cycle, tokens are passed between the nodes representing successful comparisons, with the tokens that eventually reach the terminal node representing the various instantiations of the rule. These tokens which represent successful comparisons are termed "beta tokens."

In beta-token partitioning systems, these beta tokens are divided among multiple processors of a computer system in order to approximately equally divide the computational load among the processors.

Selecting an appropriate beta-token partitioning for a particular expert system program has been difficult, in part because of the complexity of the rules comprising most expert system programs. Neuron-like circuits for performing collective computations, otherwise known as neural networks, have been developed to manipulate complex information and recognize patterns therein. Generally, a neural network comprises a complex electronic circuit modeled on biological neural networks such as the brain. In particular, a neural network comprises an array of relatively simple electronic circuits which form individual computational units, which are interconnected and programmed to generate meaningful output information in response to large amounts of input information. For example, in a neural network for recognizing an image comprising characters such as numbers or letters, the input information would comprise such information as the array of luminescence values for the pixels comprising the image (that is, whether each pixel is dark, indicating a portion of a line comprising the character was drawn over the pixel, or light, indicating that no portion of a line comprising the character was drawn over the pixel), and the output information would comprise the identity of the various characters comprising the image.

Neural networks generally are relatively tolerant of noisy or incomplete input information, and exhibit an excellent ability to generalize. Examples of neural networks are described in D. Rummelhart, et al., *Parallel Distributed Computing* (MIT Press, 1986); C. Mead, *Analog VLSI And Neural Systems* (Addison-Wesley, 1989); D. Tank, et al., "Collective Computation In Neuronlike Circuits", Scientific American, Dec., 1987, pages 104-114; Y. Abu-Mostafa, et al., "Optical Neural Computers", Scientific American, Mar., 1987, pages 88-95; and generally in the Mar., 1988, issue of I.E.E.E. Computer, Vol. 21, No. 3. Neural networks may be embodied in, generally analog, hardware, comprising amplifiers and non-linear elements interconnected by resistors, with the interconnection pattern and values of the resistors defining the programming. In addition, as with other types of electronic circuits, neural networks may be simulated by a general purpose digital computer which has been programmed to compute representations of the amplifiers, non-linear elements and resistors which would otherwise comprise a physical neural network.

SUMMARY OF THE INVENTION

The invention provides a new and improved method and system for performing beta partitioning in connection with rules in a target expert system program. In addition, the invention provides a new and improved neural network for use in facilitating beta-token partitioning in connection with rules in an expert system program.

In brief summary, the invention, in one aspect, provides a new and improved method of beta-token partitioning an expert system program comprising the steps of A. compiling the expert system program to form a RETE network for execution on a single processor;

B. executing the expert system program on a single processor and, during the execution, obtaining processing statistics in connection with each node of the RETE network;

C. entering the processing statistics into a programmed neural network to identify nodes in the RETE network for beta-token partitioning, and D. recompiling the expert system program to form a RETE network for execution on multiple processors, the RETE network being beta-token partitioned at nodes identified by the neural network.

In another aspect, the invention provides a method of generating a programmed neural network by the steps of:

A. compiling a training expert system program to form a training RETE network for execution on a single processor;

B. executing the expert system program on a single processor and, during the execution, obtaining training processing statistics in connection with each node of the training RETE network;

C. identifying a set of nodes that are substantially optimal for beta-token partitioning so as to minimize execution time on multiple processors; and D. entering the training processing statistics and the identified nodes into the neural network to thereby generate a programmed neural network.

In yet another aspect, the invention provides a programmed neural network trained by the steps of:

A. compiling a training expert system program to form a training RETE network for execution on a single processor;

B. executing the training expert system program on a single processor and, during the execution, obtaining training processing statistics in connection with each node of the training RETE network;

C. identifying a set of nodes that are substantially optimal for beta-token partitioning so as to minimize execution time on multiple processors; and D. entering the training processing statistics and the identified nodes into the neural network to thereby generate a programmed neural network.

In a further aspect, the invention provides a system comprising:

A. a uniprocessor compiler for compiling an expert system program to form a RETE network for execution on a single processor;

B. a processor for executing the expert system program, the processor obtaining processing statistics in connection with each node of the RETE network during the execution;

C. a programmed neural network for receiving processing statistics generated by the processor during execution of the expert system program, the programmed neural network identifying nodes in the RETE network for beta-token partitioning, and D. a multiprocessor compiler responsive to the node identifications by the programmed neural network for compiling the expert system program to form a RETE network for execution on multiple processors, the multiprocessor compiler generating a RETE network beta-token partitioned at the nodes identified by the neural network.

In yet a further aspect, the invention provides a computer program for use in connection with a computer comprising:

A. a uniprocessor compiler for enabling the computer to compile an expert system program to a form a RETE network for execution on a single processor;

B. a module for enabling the computer to execute the expert system program, the computer obtaining processing statistics in connection with each node of the RETE network during the execution;

C. a programmed neural network module for enabling a programmed neural network to receive processing statistics generated by the processor during execution of the expert system program, the programmed neural network identifying nodes in the RETE network for beta-token partitioning, and D. a multiprocessor compiler module for enabling the computer to, in response to the node identifications by the programmed neural network for compiling the expert system program, form a RETE network for execution on multiple processors, the multiprocessor compiler module enabling the computer to generate a RETE network beta-token partitioned at the nodes identified by the neural network.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A-1 and 3B depict flow charts describing, respectively, a learning operation in connection with programming a neural network for beta-token partitioning and using a programmed neural network for beta-token partitioning, and FIG. 3A-2 depicts a chart useful in understanding the operations depicted in FIG. 3A-1.

DETAILED DESCRIPTION OF AN ILLUSTRATIVE EMBODIMENT

Figure 1:
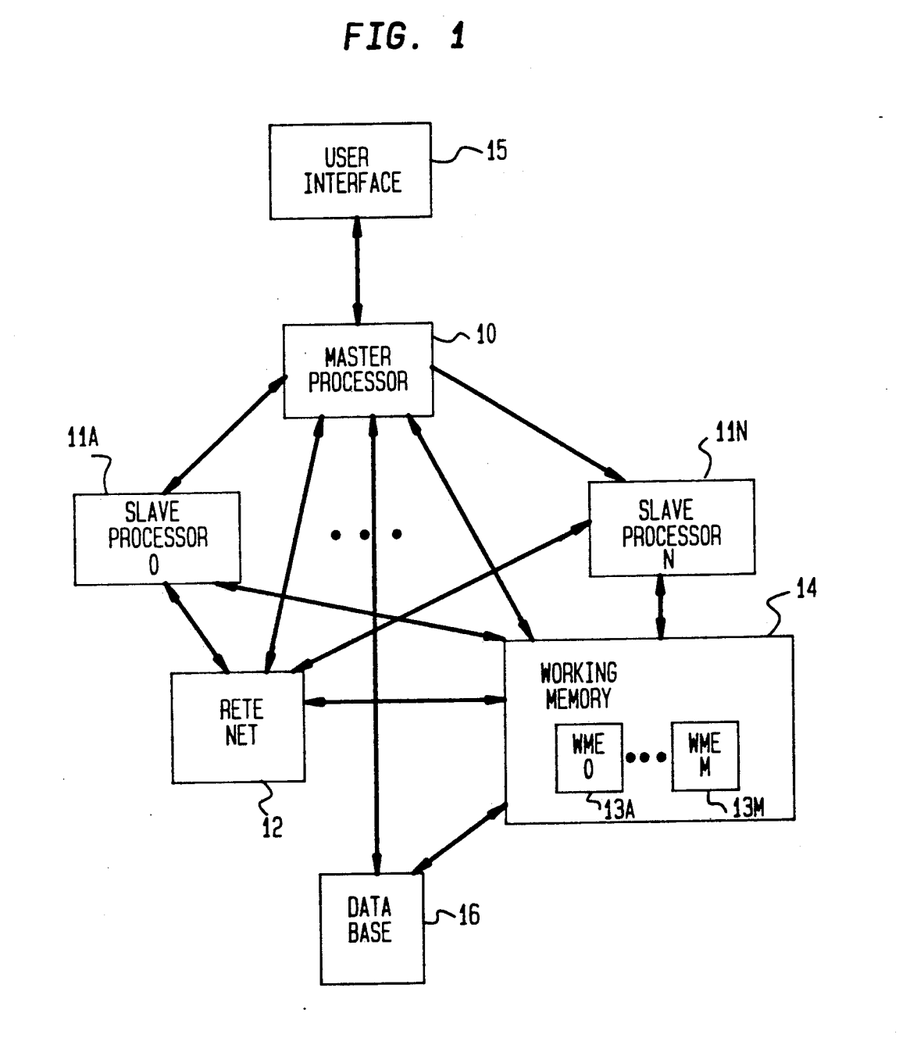
FIGS. 1 and 2 depict a target expert system with respect to which the invention is used.
Figure 2:
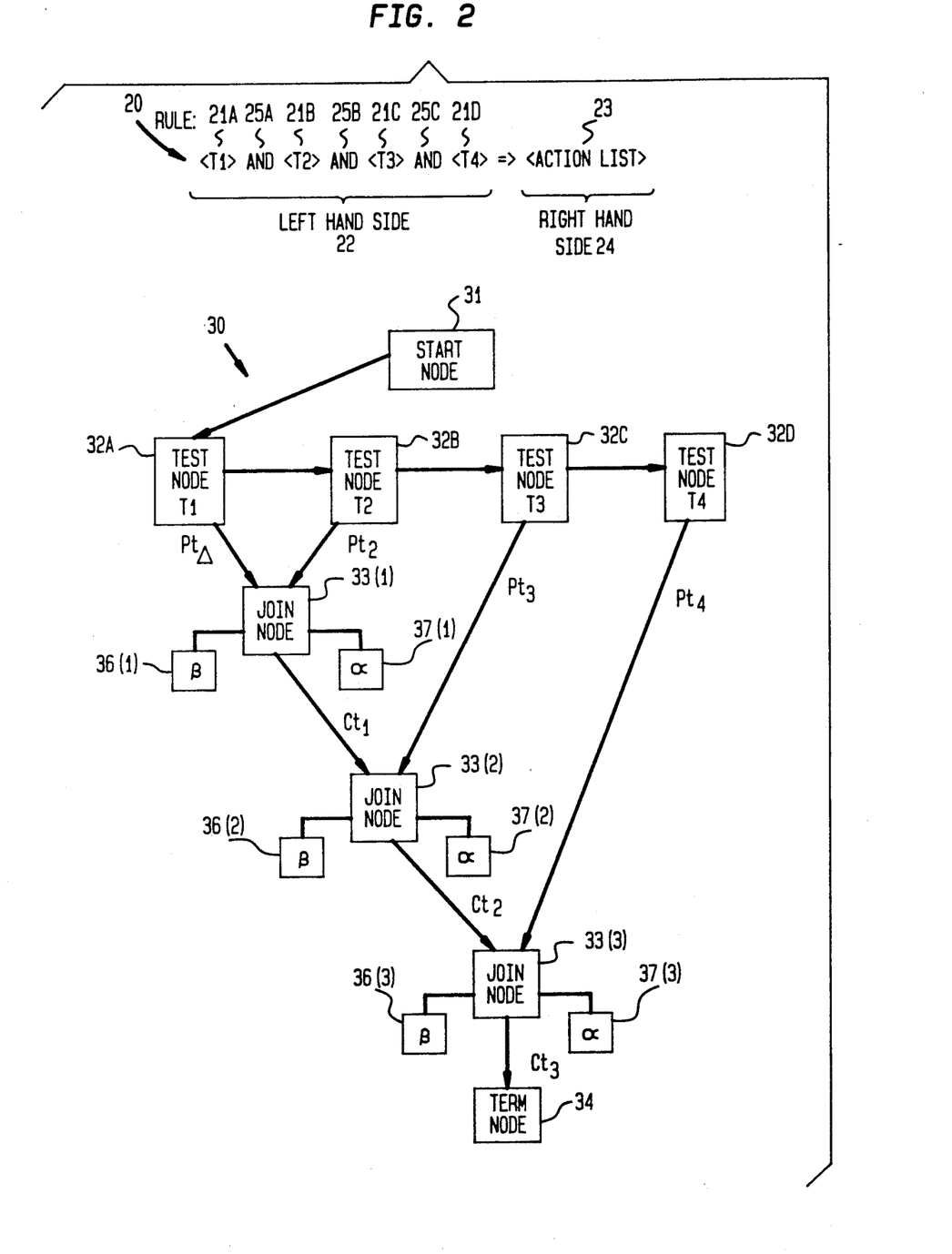

By way of background, the invention is useful in connection with an expert system such as depicted in FIGS. 1 and 2. With reference to FIG. 1, the expert system includes a master processor 10 and a plurality of slave processors 11A through 11N (generally identified by reference numeral 11) that process rules organized in a RETE network 12 using working memory elements 13A through 13M (generally identified by reference numeral 13) in a working memory 14 and information provided by an operator at a user interface 15. The master processor 10 enables the system to be initialized, including the creation of an initial set of working memory elements 13 in the working memory 14 based on data in a database 16. In addition, the master processor 10 enables the slave processors 11 to operate to process the working memory elements 13 in relation to the rules in the RETE network 12. It will be appreciated that, during the rule processing operations, the master processor 10 may also assist in the rule processing operations, operating effectively as another slave processor 11.

The slave processors 11 process the rules organized in the RETE network 12 in an inference cycle. That is, in response to a change in the working memory elements 13 in the working memory 14, which may result from, for example, the creation of a new working memory element 13 by the deposit of information by the operator at the user interface 15, or by the creation of one or more working memory elements 13 by the firing of a rule in the RETE network 12 during a previous inference cycle, the slave processors 11 process the rules in the RETE network 12 using the working memory elements 13 then in the working memory 14, select one rule to execute, or fire, and perform actions identified in the rule. The actions may include, for example, deposit of a new working memory element 13 in the working memory 14, deletion of a working memory element 13 from the working memory 14, modification of a working memory element 13, transmission of a message to the user interface 15 for display to an operator, termination of operation, and the like. The system may iteratively perform one or a number of inference cycles, until either (1) no rule remains that has all of its conditions satisfied, or (2) one of the actions specified by a rule selected to fire is a termination of operation. At that point, the system may wait for the operator to deposit further information, thereby creating a change of the working memory elements 13 in the working memory 14, before beginning another inference cycle.

As noted above, the rules are organized in the form of the RETE network 12. By way of background, one example of a rule and its RETE network equivalent are shown in FIG. 2. With reference to FIG. 2, the rule, identified by reference numeral 20, includes one or more conditions 21A through 21D (generally identified by reference numeral 21) and logical connectors 25A through 25C (generally identified by reference numeral 25) that define logical relationships among the conditions 21, all of which are collectively identified as its "left hand side" 22, and an action list 23 comprising its "right hand side" 24. During an inference cycle, the set of conditions 21 comprising the left hand side 22 and the logical relationships defined by the logical connectors 25 are tested against the working memory elements 13 contained in the working memory 14 to identify those rules 20 whose left hand sides are satisfied. Those rules 20 whose left hand sides are satisfied are said to be in condition for firing.

After all of the rules have been processed to identify those in condition for firing, conflict resolution information (not shown), which may be included with the rules, is used to identify which rule of the one or more of the rules 20 that are in condition for firing will actually be fired. In firing a rule 20, one or more operations, as defined in the action list 23 comprising the rule's right hand side 24, are performed to complete the inference cycle. If the firing results in a creation, deletion or modification of a working memory element 13, another inference cycle may be performed to process the rules comprising the RETE network 12 in connection with the new collection of working memory elements 13.

The portion 30 of the RETE network 12 for the rule 20 is also shown in FIG. 2. The portion 30 includes a plurality of nodes, including a start node 31, a test node list 32 comprising one or more test nodes 32(i) ["i" being an integer; four test nodes, identified by reference numerals 32(1) through 32(4), are shown in FIG. 2], one or more join nodes 33(1) through 33(3) (generally identified by reference numeral 33) and a terminal node 34. Each of the test nodes 32 corresponds to, a test of one of the conditions 21 in the left hand side 22 of the rule. Similarly, each join node 33 corresponds to a logical connector 25 in a rule. The last join node 33(3) in the sequence connects to the terminal node 34, which effectively represents the rule's action list 23.

In one embodiment of the RETE network 12, the test node list 32 essentially forms a linked list, and the start node 31 contains a pointer identifying a first test node 32(1) in the list 32. Each test node 32(i), in turn, contains a pointer to a subsequent test node 32(i+1), with the last test node 32 containing, instead of a pointer to a subsequent test node, a value identifying it as the last test node in the list 32. Each test node 32(i), in turn, defines a test condition and also contains a pointer to a join node 33 defining a logical connector 25. The join node 33(1) defining the first logical connector 25A in the rule 20 is pointed to by the test nodes 32(1) and 32(2) for the first two conditions in the rule, and the join node 33(i) ("i" is an integer) for each subsequent logical connector 25(i) is pointed to by the preceding join node 33(i−1) and the test node 32(i+1) for the condition 21(i+1) in the rule 20 immediately after the logical connector 25(i).

It will be appreciated that normally the expert system (FIG. 1) will include a number of rules, and the RETE network 12 will have a number of portions similar to portion 30 for the various rules. Typically, such a RETE network will have a plurality of test nodes 32(i), one test node 32(i) for each of the distinct conditions in the rules so that, if the same condition appears in multiple rules, the RETE network 12 will include only one test node 32(i) therefor. In that case, the test node 32(i) will have pointers to each of the join nodes 33 for the different rules, thereby enabling multiple rules to share test nodes 32(i). In addition, join nodes 33 may be shared among rules if the same series of preceding join nodes and test conditions are used in multiple rules. The RETE network 12 thus facilitates sharing of test nodes 32(i) and join nodes 33 among a plurality of rules, represented by terminal nodes 34.

In operation, the slave processors 11 use the pointer of the start node 31 to identify the test node list 32 containing test nodes 32(i) representing the various conditions and test the test conditions pointed to thereby in connection with the working memory elements 13 in the working memory 14. If a working memory element 13 satisfies a test condition of a test node, the slave processor 11 generates a primitive token Pt ["n" corresponding to the test node 32(i) in response to which the primitive token was generated] and deposits it in a beta memory 36(i) (generally identified by reference numeral 36) or an alpha memory 37(1) (generally identified by reference numeral 37), both of which are associated with the join node 33(i) identified by the test node 32(j) ("j" comprising an integer). If, as is the case with test node 32(1), the test condition 21 in the rule 20 is to the left (as shown in FIG. 2) of the logical connector 25 represented by join node 33, the primitive token $Pt_n$ is deposited in the beta memory 36 of the join node 33. Otherwise, as is the case with test nodes 32(2) through 32(4), if the test condition 21 is to the right (as shown in FIG. 2) of the logical connectors 25A through 25C represented by join nodes 33(1) through 33(3), respectively, the primitive tokens $Pt_n$ are deposited in the alpha memories 37 of the respective join nodes 33(1) through 33(3).

In particular, with reference to the example shown in FIG. 2, if the slave processor 11 processing the condition identified by the test node 32(1) determines that a working memory element 13 satisfies the condition, it generates a primitive token $Pt_1$, which it loads into the beta memory 36(1) associated with the join node 33(1). The primitive token $Pt_1$ identifies the working memory element 13 that satisfied the condition. If multiple working memory elements 13 satisfy the condition, the slave processor 11 generates multiple primitive tokens for storage in the beta memory 36. Similarly, if a slave processor 11 processing the condition identified by the test node 32(2) determines that one or more working memory elements 13 satisfy the condition identified by that test node, it generates corresponding primitive tokens $Pt_2$, which it loads into the alpha memory 37(1) associated with the join node 33(1). The slave processors 11 processing the conditions identified by the remaining test nodes 32(3) and 32(4) associated with portion 30, perform similar operations, loading primitive tokens into alpha memories 37(2) and 37(3) associated with the join nodes 33(2) and 33(3), respectively. The slave processors 11 perform similar operations in connection with rules defined by all of the portions of the RETE network 12.

The slave processors 11 may perform the test operations defined by the test nodes 32(i) on the working memory elements 13 in parallel. The test nodes 32(i) may be apportioned among slave processors 11 by any scheme, such as by round-robin allocation of portions 30 to the various slave processors 11, and each slave processor 11 may perform the test operations in connection with all the working memory elements 13.

After the slave processors 11 have tested at least some of the working memory elements 13 in relation to the test nodes 32, and deposited the requisite primitive tokens $Pt_n$ in the respective memories 36 or 37 of the join nodes 33, they proceed to perform tests defined by the successive join nodes 33(1) through 33(3) to identify sets of working memory elements 13 that satisfy each succeeding logical connection identified by the join nodes 33. As a slave processor 11 performs the test for the logical connection defined by a join node 33, it generates one or more complex tokens $Ct_n$ identifying combinations of working memory relations or elements 13 which satisfied the test. For example, a slave processor 11 processing the join node 33(1) (FIG. 2) generates complex tokens $Ct_1$, which it deposits in the beta memory 36 of the join node 33(2). Each complex token $Ct_1$ identifies a pair of working memory relations or elements 13 which jointly satisfy the logical operation defined by the logical connector 25A represented by the join node 33(1).

The slave processors 11 process the other join nodes 33(2) and 33(3) in a similar manner. In the case of join node 33(2), the slave processors 11 perform the logical operation defined by the logical connector 25B in connection with the complex tokens $Ct_1$ in the beta memory 36(2) of the join node 33(2) and the primitive tokens $Pt_3$ in its alpha memory 37(2) to generate complex tokens $Ct_2$. Each complex token $Ct_2$ identifies groups of working memory relations or elements 13, which are jointly identified by a complex token $Ct_1$ in the beta memory 36(2) of the join node 33(2), and primitive tokens $Pt_3$ in the alpha memory 37(2) of the join node 33(2), that jointly satisfy the logical operation defined by the logical connector represented by the join node 33(2). The slave processors deposit the complex tokens $Ct_2$ in the beta memory 36(3) of the join node 33(3).

Similarly, in the case of join node 33(3), the slave processors 11 perform the logical operation defined by the logical connector 25C in connection with the complex tokens $Ct_2$ in the beta memory 36(3) of the join node 33(3) and the primitive tokens $Pt_4$ in the alpha memory 37(30 of the join node 33(3) to generate complex tokens $Ct_3$. Each complex token $Ct_3$ identifies groups of working memory or relations elements 13, which are jointly identified by a complex token $Ct_2$, in the beta memory 36(3) of the join node 33(3), and primitive token $Pt_4$ in the alpha memory 37(3) of the join node 33(3), that jointly satisfy the logical operation defined by the logical connector 25 represented by the join node 33(3). The slave processors 11 deposit the complex tokens $Ct_3$ in terminal node 34.

Each complex token $Ct_3$ in the terminal node 34 represents an instantiation of the rule represented by the terminal node 34. That is, each complex token $Ct_3$ represents a combination of working memory elements 13 that satisfies the rule. The slave processors 11 identify the terminal nodes 34 representing the rules in the expert system that have complex tokens, and perform conflict resolution operations in connection with those rules, to identify one or several instantiations to fire. In selecting an instantiation to fire, the slave processors 11 use conflict information (not shown) which may accompany the various rules in a conventional manner.

Figure 3A:
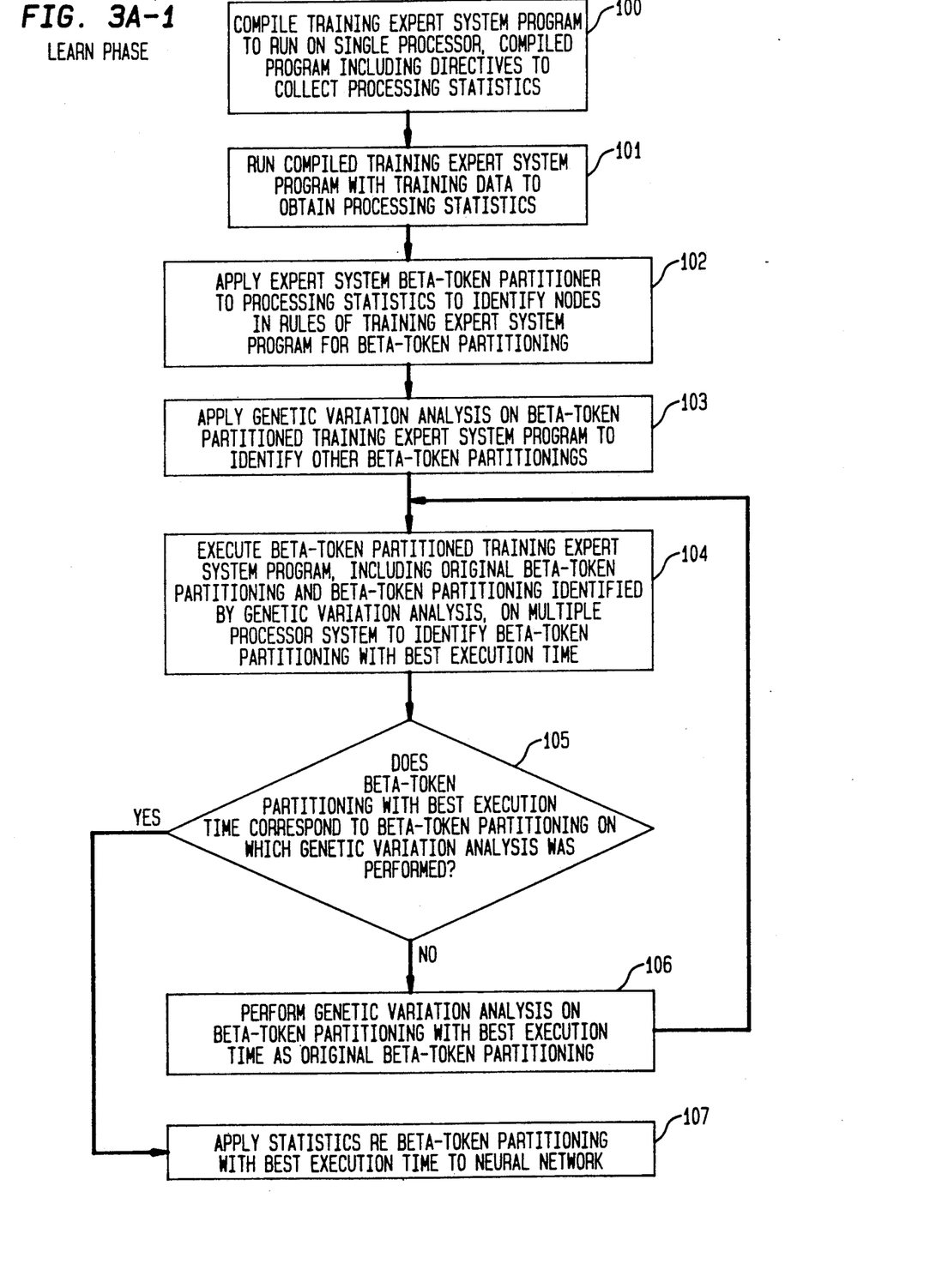
Figure 3A:
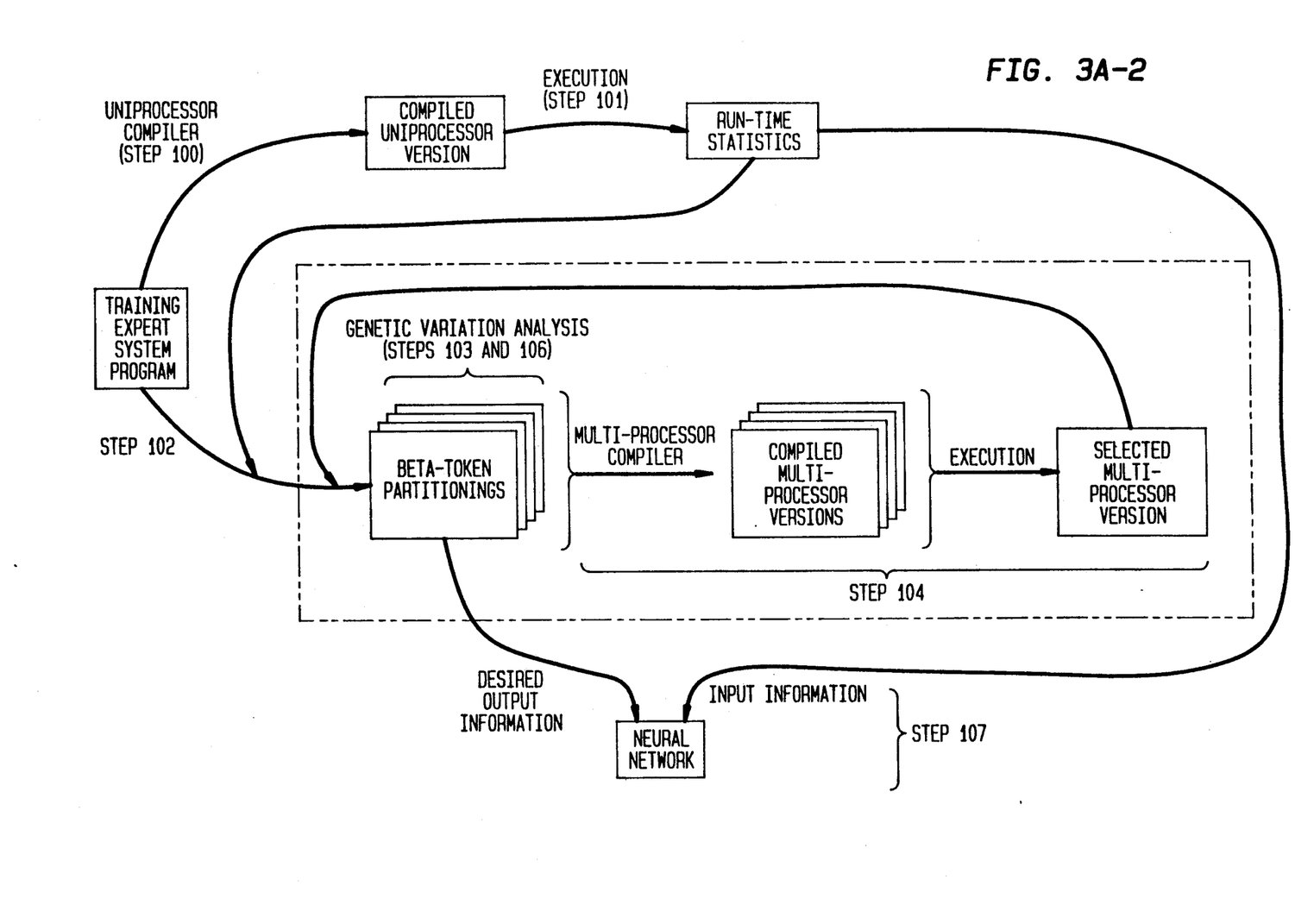
Figure 3B:
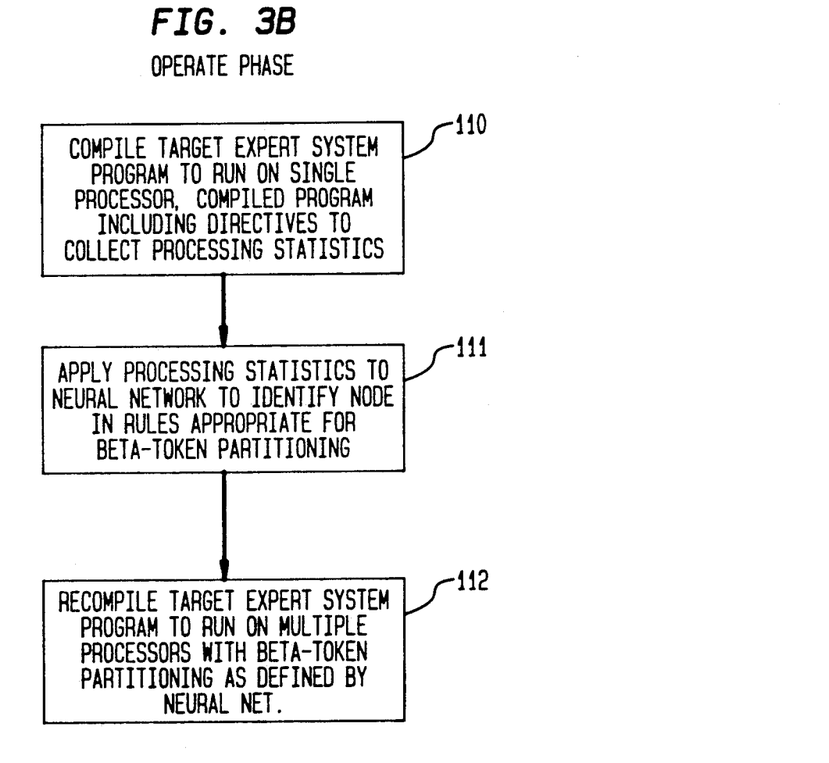

The invention provides a system, generally depicted in FIGS. 3A-1 through 3B, to enhance the processing of the RETE network 12 in parallel by the various slave processors 11. The system includes a neural network for determining a beta-token partitioning to divide the processing defined by the various nodes 33 among the various slave processors 11. RETE net beta-token partitioning is generally described in the aforementioned U.S. patent application Ser. No. 103,364, filed Sept. 30, 1987, in the name of William Barabash and William S. Yerazunis and entitled "Method For Operating A Parallel Processing System And Related Apparatus" now U.S. Pat. No. 4,965,882. As described therein, tokens $Pt_n$ or $Ct_n$ in either the beta memory 36 or alpha memory 37 of one join node 33 in one or more of the various rules are divided among the respective slave processors 11. Thus, beta-token partitioning effectively enables the contents of either a beta memory 36 or alpha memory 37 at a join node 33 to be divided among the various slave processors 11 during processing of the expert system program. In the aforementioned application, the beta-token partitioning is described as being performed on the first join node 33(1) in all of the rules, but it notes that partitioning may be performed on any join node 33.

In accordance with the invention, a neural network beta-token partitioner is provided which identifies, within a rule, an optimum join node 33 at which beta-token partitioning is performed. That is, for a particular rule, the neural network beta-token partitioner may identify a join node 33 as being a candidate for beta-token partitioning, and if so also indicates whether beta-token partitioning should be performed in connection with the join node's left memory 36 or its right memory 37. On the other hand, the neural network may identify no join node 33 for a rule, in which case no beta-token partition occurs in the rule.

In one embodiment, the neural network beta-token partitioner comprises a conventional neural network, which may be instantiated either in hardware or simulated by a suitably programmed general purpose computer system. The neural network is programmed by a conventional back-propagation method during a learning phase, which is depicted in FIGS. 3A-1 and 3A-2, and, after being programmed, is operated during an operational phase, which is depicted in FIG. 3B. Programming of a neural network by back propagation is more specifically described in R. Lippmann, "An Introduction To Computing With Neural Nets", I.E.E.E. ASSP Magazine, April, 1987, p. 4. During the learning phase, information generated from training examples is coupled to a neural network, which uses the information in a conventional manner to regenerate, or program, itself into a programmed neural network. Criteria used in the selection of the training examples are described in the aforementioned D. Rummelhart, et al., *Parallel Distributed Computing* (MIT Press, 1986). The information used to program the neural network in accordance with back-propagation, includes both input information patterns and output information, with each item of output information being associated with each input information pattern. The association between each input information pattern and an output information item is used to adjust various circuit parameters in a neural network embodied in hardware, or to adjust parameters in the various equations representing the hardware circuit in a simulated neural network as processed by a digital computer. The information used during the learning phase comprises, as the input information patterns, sets of processing statistics that are generated during execution of training expert system programs (one set of processing statistics being generated for each of the training expert system programs), and, for each set of processing statistics, desired output information comprising the identification of optimal beta-token partitionings thereof.

During the learning phase, processing statistics and optimal beta-token partitioning of, preferably, a number of training expert system programs are used to program the neural network. The operations with respect to one training expert system program are depicted in FIGS. 3A-1 and 3A-2. With reference FIGS. 3A-1 and 3A-2, during the learning phase a training expert system program is first compiled into a RETE network for execution on a single processor (step 100). The compiled expert system program includes directives to facilitate collection of a number of statistics regarding processing at each node during execution on a single processor, and particularly for each of the beta memory 36 and alpha memory 37, for each join node 33. After compilation, the compiled training expert system program is executed on a single processor, using training input data, to obtain the processing statistics determined by the directives.

The processing statistics that are collected during execution on a single processor (step 100) are the same as those collected as described in the aforementioned U.S. patent application Ser. No. 364,021, filed on Jun. 8, 1989, in the names of William Barabash and William S. Yerazunis, for Expert System for Performing Beta-Token Partitioning In A RETE Network. The statistics generally include such information as the number of primitive and complex tokens $Pt_n$ and $Ct_n$ received in the beta memory 36 and alpha memory 37 of each of the join nodes 33, the number of comparisons performed in connection with processing of the join nodes 33 in generating the complex tokens $Ct_n$, and the amount of processor time spent at each join node 33. The processing statistics are collected separately for each node activation, that is, for each of the beta memory 36 and alpha memory 37 of each node, and include statistics relating to the number of activations, the number of emissions and the number of comparisons. The "number of activations" statistics relates to the number of tokens, whether primitive tokens $Pt_n$ or complex tokens $Ct_n$ deposited in the beta memory 36, if the node activation data structure relates to a left node activation (that is, a node activation testing one or more conditions 21 to the left of the logical connector 25 defining the join node 33), or in the alpha memory 37 if the node activation data structure 120 relates to a right node activation. The "number of emissions" statistics relates to the number of complex tokens $Ct_n$ that are generated and emitted while processing the join node 33, and the "number of comparisons" statistics relate to the number of comparisons performed during processing of the join node 33.

The processing statistics include, for each of these three types of statistics, values regarding total activations, emissions and comparisons, respectively, performed in connection with the node activation over the entire time during which processing statistics were generated, and values regarding the maximum number of activations, emissions and comparisons, respectively, performed in any single recognize/act cycle. In addition, processing statistics include values identifying the total amount of processing time spent processing the join node and the maximum amount of time spent processing during a recognize/act cycle.

After the training expert system program is complied, it is run on a digital data processing system including a single processor one or more times to facilitate the collection of the processing statistics (step 101). After processing statistics have been collected, they are analyzed to identify node activations (if any) suitable for beta-token partitioning (step 102). This may be done manually or by use of, for example, a beta-token partitioning expert system such as described in the aforementioned U.S. patent application Ser. No. 364,021, filed on Jun. 8, 1989, in the names of William Barabash and William S. Yerazunis, for Expert System for Performing Beta-Token Partitioning In A RETE Network.

After node activations suitable for beta-token partitioning have been identified in step 102, a "genetic variation" analysis operation is performed (step 103). In performing the genetic variation analysis, it is assumed in step 102 that the expert system beta-token partitioner will either have identified an optimum beta-token partitioning of the training expert system program, or a beta-token partitioning in which the identified node activations are roughly proximate to the optimum node partitioning. Generally, the "genetic variation" analysis operation generates a plurality of beta-token partitionings for the training expert system program, which are used in generating a like plurality of multi-processor versions of the training program. The multi-processor versions of the training program are then executed on a digital data processing system including multiple processor using training data to identify the one multi-processor version with the best execution time. The processing statistics, which were determined in step 101, and the beta-token partitioning determined to provide the best execution time are then used in programming the neural network.

With this background, in the genetic variation analysis operation (step 103), for each beta-partitioned rule in the training expert system program the location of the node activation at which beta-token partitioning is to occur is varied up and down the portion of the rule's RETE network within a selected range of the node activation identified by the expert system beta-token partitioner in step 102, with the beta-token partitionings for the other rules in the training expert system program being maintained constant. Each node activation within the range provides a location, that is, a node activation of a join node 33, at which beta-token partitioning occurs for the rule. This operation is repeated for each rule identified by the beta-token partitioning expert system as being beta-token partitionable, resulting in a set of beta-token partions for the training expert system program.

The training expert system program is then recompiled to form a plurality of multiple-processor versions (step 104), each representing either the beta-token partitioning identified by the expert system beta-token partitioner (step 102) or during the genetic variation analysis operation (step 103). Each of the multiple processor versions of the training expert system program is executed using training data to identify the beta-token partitioning with an optimal execution time (step 104). If the beta-token partitioning with the optimal execution time determined in step 104 is the same as the original beta-token partitioning (step 105), the original beta-token partitioning is assumed to provide an optimal execution time, and so the genetic variation operation phase of the procedure is complete. In that case, the sequence proceeds to step 107 to use the processing statistics determined in step 101 and the beta-token partitioning determined in step 102 to program the neural network.

If, in step 105, the beta-token partitioning with the optimal execution time determined in step 104 is not the same as the original beta-token partitioning determined in step 103, another genetic variation operation is performed (step 106), with the beta-token partitioning determined in step 104 to have the best execution time comprising the original beta-token partitioning, and step 104 is performed again. To verify that the beta-token partitioning originally determined in step 106 is indeed optimal, or to determine another beta-token partitioning which may be more optimal than that originally determined in step 106, steps 104 through 106 may be iteratively performed. During each iteration, the beta-token partitioning determined, in step 104 of the previous iteration, to have the optimal execution time is used the original beta-token partitioning in the genetic variation analysis operation for the iteration (in step 106). Iterations continue until the beta-token partitioning determined to have the optimal execution time in an iteration in step 104 corresponds to the original beta-token partitioning used at the beginning of the iteration. Alternatively, the iterations may terminate after a predetermined maximum number of iterations have been performed.

The statistics developed during the uniprocessor execution of the training expert system program (step 101) and the beta-token partitioning with the optimal execution time (determined during step 104) are then used as one set of training cases to program the neural network (step 107). In this operation, the identification of the node activations identified as being beta-token partitionable is supplied, as desired output information, to the neural network, along with input information comprising the processing statistics, identified during step 101, for the node activation, the opposite node activation of its particular join node 33(i), as well as the left and right node activations of the parent join node 33(i−1) and child join node 33(i+1), if any. Thus, the neural network programming includes, as information representing the input patterns, identifying information and processing statistics the node activation at which beta-token partitioning is to occur (that is, the beta memory 36 or alpha memory 37 whose tokens are to be distributed for processing among the various slave processors 11, FIG. 1) as well as the processing statistics for the opposite node activation and the node activations for the surrounding join nodes.

It will be appreciated that the operations depicted in FIGS. 3A-1 and 3A-2 are preferably performed a number of times with a number of training expert system programs. As is widely-known, programming of a neural network is enhanced by providing information relating to a large number of training expert system programs.

After the neural network is programmed using one or more training expert system programs, it may be used during an operational phase to identify beta-token partitionings for other expert system programs, identified as "target expert system programs" as shown in the flow diagram depicted in FIG. 3B. With reference to FIG. 3B, a target expert system program to be beta-token partitioned by the programmed neural network is first complied to form a RETE network for execution on a single processor (step 110). The compiled target expert system program includes directives to facilitate collection of the same types of processing statistics as during the learning phase. After compilation, the compiled target expert system program is executed on a single processor, using input data, to obtain the processing statistics as determined by the directives (step 111). Thereafter, the processing statistics for the various node activations are applied to the neural network, which identifies suitable beta-token partitionings for the RETE network. The target expert system program is thereafter recompiled into a RETE network for execution on multiple processors, with beta-token partitioning identified by the neural network. The neural network, programmed as described above in connection with FIGS. 3A-1 and 3A-2 thus identified an optimal or near optimal beta-token partitioning for the expert system program.

It will be appreciated that, if the neural network is programmable following the learning phase (FIGS. 3A-1 and 3A-2), steps 103 through 105 (FIG. 3A) may be performed on the target expert system program to further program the neural network. In particular, a genetic variation analyses may be performed in connection with the beta-token partitioning of the target expert system program as determined in step 111 (step 103). Thereafter, the target expert system program is compiled for each of the beta-token partitionings, including that identified by the neural network in step 111 and those identified by the genetic variation analysis, and the compiled programs are executed to identify one with the optimal execution timing. The beta-token partitioning with the optimal execution timing may be used for the recompiled target expert system program, and also the beta-token partitioning and processing statistics may be used to further program the neural network.

The invention thus provides a neural network for assisting in the beta-token partitioning of an expert system program. It will be appreciated that the operations depicted in FIGS. 3A-1 and 3A-2 during the learning phase, and in FIG. 3B during the operational phase, each step may be separately performed by a digital data processing system or neural network, and an operator may enable each step to be performed. Alternatively, a computer program may be used to sequence through the steps set forth in FIGS. 3A-1, 3A-2 and 3B. Furthermore, the genetic variation analysis operation may be performed manually or by a digital data processing system.

As noted above, the neural network programmed as described in connection with FIGS. 3A-1 and 3A-2 and 3B may be used to determine optimal or near optimal beta-token partitionings of a rule-based expert system. It will be appreciated that the neural network may also be used to determine, by means of a well-known cluster-factor analysis, additional rules for the expert system beta-token partitioning system described in the aforementioned U.S. patent application Ser. No. 364,021, filed on Jun. 8, 1989, and to modify the existing rules that are described therein.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system for building a reticular discrimination network (RETE network) capable of being partitioned across a set of multiple, interconnected computer processors comprising a computer system, from at least a portion of a target expert system, the target expert system comprising a plurality of rules each of which comprises a plurality of conditions grouped in a sequence by a set of logical connectors and a result to occur when the conditions and the logical connectors of the rule are satisfied, the conditions and logical connectors of the rule being satisfied in comparison against a set of data elements, certain ones of the plurality of rules having conditions that are equivalent to conditions in other ones of the plurality of rules, certain ones of the plurality of rules having sequences of conditions and logical connectors that are equivalent to sequences of conditions and logical connectors in other ones of the plurality of the rules, each of the conditions in a rule being represented by a test node and each of the logical connectors being represented by a join node in the RETE network, each join node having node memory associated therewith, the test and join nodes being arranged to determine the satisfaction of the conditions and operation of the logical connectors as represented by the nodes, the nodes also being coupled together to represent the sequenc of conditions and logical connectors of the rules of the target expert system, the functions of each of the nodes capable of being performed on one of the multiple processors of the computer system, the system for building a RETE network comprising:

a. a memory configured to store the target expert system and a set of testing data elements for use in determining the satisfaction of the conditions of the rules;

b. a beta-token statistics generator coupled to the memory and configured to create a testing RETE-net from the stored target expert system comprising a set of test nodes and join nodes representing the conditions and logical connectors in the rules of the target expert system arranged such that shared sequences of conditions and logical connectors are represented only once and to generate processing statistics for each join node of the testing RETE network by applying the set of testing data elements to the testing RETE network;

c. a programmed neural network coupled to the beta-token statistics generator and configured to generate indicators that identify nodes in the target expert system for beta-token partitioning based on the processing statistics from the beta-token statistics generator.

d. an allocator arranged to allocate the nodes and the node memory associated with the join nodes of the testing RETE network to partitions as a function of the indicators generated by the programmed neural network, each partition representing one of the multiple processors; and e. a RETE network builder coupled to the allocator to convert the rules of the target expert system into a computer-executable RETE network, according to the partitions, each partition of the RETE network being arranged to execute on a corresponding one of the multiple processors.

2. A system for building a reticular discrimination network (RETE network) capable of being partitioned across a set of multiple, interconnected computer processors comprising a computer system, from at least a portion of a target expert system, the target expert system comprising a plurality of rules each of which comprises a plurality of conditions grouped in a sequence by a set of logical connectors and a result to occur when the conditions and the logical connectors of the rule are satisfied, the conditions and logical connectors of the rule being satisfied in comparison against a set of data elements, certain ones of the plurality of rules having conditions that are equivalent to conditions in other ones of the plurality of rules, certain ones of the plurality of rules having sequences of conditions and logical connectors that are equivalent to sequences of conditions and logical connectors in other ones of the plurality of the rules, each of the conditions in a rule being represented by a test node and each of the logical connectors being represented by a join node in the RETE network, each join node having node memory associated therewith the test and join nodes being arranged to determine the satisfaction of the conditions and operation of the logical connectors as represented by the nodes, the nodes also being coupled together to represent the sequence of conditions and logical connectors of the rules of the target expert system, the functions of each of the nodes capable of being performed on one of the multiple processors of the computer system, the system for building a RETE network comprising:

a. a memory configured to store the target expert system and store a set of testing data elements for use in determining the satisfaction of the conditions of the rules;

b. a beta-token statistics generator coupled to the memory and configured to create a testing RETE-net from the stored target expert system comprising a set of test nodes and join nodes representing the conditions and logical connectors in the rules of the target expert system arranged such that shared sequences of conditions and logical connectors are represented only once and to generate testing processing statistics for join nodes of the testing RETE network by applying the set of testing data elements to the testing RETE network;

c. a neural network programming data provider that provides a neural network with programming data so that the neural network can be programmed to generate beta indicators identifying nodes in the target expert system for beta-token partitioning based on the testing processing statistics;

d. a programmed neural network coupled to the beta-token statistics generator and programmed with the data from the neural network programming data provider to generate beta indicators that identify nodes in the target expert system for beta-token partitioning based on the processing statistics from the beta-token statistics generator;

e. an allocator arranged to allocate the nodes and the node memory associated with the join nodes of the testing RETE network to partitions as a function of the indicators generated by the programmed neural network, each partition representing one of the multiple processors; and f. a RETE network builder coupled to the allocator to convert the rules of the target expert system into a computer-executable RETE network, according to the partitions, each partition of the RETE network being arranged to execute on a corresponding processor.

3. The system for building a RETE network of claim 2 in which the neural network programming data provider comprises:

i. at least one training expert system program;

ii. a training memory configured to store the at least one training expert system and a set of testing data elements for use in determining the satisfaction of the conditions of the rules;

iii. a training beta-token statistics generator coupled to the training memory and configured to create at least one training RETE network from the at least one stored training expert system comprising a set of testing nodes and join nodes representing the conditions and logical connectors in the rules of the training expert system arranged such that shared sequences of conditions and logical connectors are represented only once and generate training processing statistics for join nodes of the at least one training RETE network by applying the set of testing training data elements to the at least one training RETE network;

iv. an analyzer that takes the at least one training RETE network and produces training beta indicators that indicate nodes of the at least one training RETE network at which beta-token partitioning minimize processing time; and v. a provider for giving to the neural network to be programmed the processing statistics from the beta token statistics generator and indicators generated by the analyzer so that the neural network can program itself to perform beta token partitioning.

4. The system for building a RETE network of claim 3 wherein the analyzer is coupled to the training beta-token statistics generator and further comprises means for producing training beta indicators as a function of the training processing statistics from the beta-token statistics generator.

5. The system for building a RETE network of claim 3 wherein the analyzer is coupled to the training beta-token statistics generator and the analyzer further comprises a beta-token partitioner which helps generate the training beta indicators as a function of the processing statistics from the beta-token statistics generator.

6. The system for building a RETE network of claim 3 wherein the analyzer further comprises:

a. an analyzing beta-token partitioner coupled to the beta-token statistics generator that produces preliminary training beta indicators as a function of the training processing statistics to indicate nodes at which beta-token partitioning should take place; and b. a genetic variation analyzer coupled to the beta-token partitioner that produces variation indicators that uses genetic variation analysis as a function of the preliminary training to produce the training beta indicators.

7. The system for building a RETE network of claim 6 wherein the genetic variation analyzer further comprises:

i. a preliminary partitioner for producing a preliminary partitioning of the training expert system as a function of the preliminary training indicators;

ii. means for applying genetic variation analysis to produce other partitionings for the training expert system as a function of the preliminary training indicators;

iii. an executor coupled to the genetic variation means and the preliminary paritioner for executing partitioned RETE networks on the computer system from partitionings produced by the preliminary partitioner and the genetic variation means;

iv. an executor processing statistics generator coupled to the executor that generates execution processing statistics for the execution of partitioned RETE networks by the executor; and v. means for producing the training beta indicators.

8. The system for building a RETE network of claim 7 wherein the executor processing statistics generator includes means for generating the statistic of execution time for the partitioned RETE networks executed by the executor.

9. The system for building a RETE network of claim 8 wherein the means for producing the training beta indicators includes means for producing training beta indicators as a function of the execution times generated by the executor processing statistics generator.

10. The system for building a RETE network of claim 8 wherein the means for producing the training beta indicators includes means for indicating that beta-token processing should take place as occurs in the executed partitioning with the least execution time.

11. A method for building a reticular discrimination network (RETE network) capable of being partitioned across a set of multiple, interconnected computer processors comprising a computer system, from at least a portion of a target expert system, the target expert system comprising a plurality of rules, each of which comprises a plurality of conditions grouped in a sequence by a set of logical connectors and a result to occur when the conditions and the logical connectors of the rule are satisfied, the conditions and logical connectors of the rules being satisfied in comparison against a set of data elements, certain ones of the plurality of rules having conditions that are equivalent to conditions in other ones of the plurality of rules, certain ones of the plurality of rules having sequences of conditions and logical connectors that are equivalent to sequences of conditions and logical connectors in other ones of the plurality of the rules, each of the conditions in a rule being represented by a test node and each of the logical connectors being represented by a join node in the RETE network, each join node having node memory associated therewith, the test and join nodes being arranged to determine the satisfaction of the conditions and operation of the logical connectors as represented by the nodes, the nodes also being coupled together to represent the sequence of conditions and logical connectors of the rules of the target expert system, the functions each of the nodes capable of being performed on one of the multiple processors of the computer system, the method for building a RETE network comprising the steps of:

a. storing the target expert system in a memory;

b. storing in the memory a set of testing data elements for use in determining the satisfaction of the conditions of the rules;

c. utilizing the target expert system in the memory to create a testing RETE network from the stored target expert system, the RETE network comprising a set of test nodes and join nodes representing the conditions and logical connectors in the rules of the target expert system arranged such that shared sequences of conditions and logical connectors are represented only once, the join nodes having node memory associated therewith;

d. generating processing statistics for each join node of the testing RETE network by applying the set of testing data elements to the RETE network;

e. generating indicators for beta-token partitioning by applying the target expert system and processing statistics to a programmed neural network;

g. allocating the nodes and the node memory associated with the join nodes of the testing RETE network to partitions based on indicators generated by the programmed neural network, each partition representing one of the multiple processors; and h. converting the rules of the target expert system into a computer-executable RETE network, according to the partitions, each partition of the RETE network being arranged to execute on a corresponding one of the multiple processors.

12. A method for building a reticular discrimination network (RETE network) capable of being partitioned across a set of multiple, interconnected computer processors comprising a computer system, from at least a portion of a target expert system, the target expert system comprising a plurality of rules, each of which comprises a plurality of conditions grouped in a sequence by a set of logical connectors and a result to occur when the conditions and the logical connectors of the rule are satisfied, the conditions and logical connectors of the rules being satisfied in comparison against a set of data elements, certain ones of the plurality of rules having conditions that are equivalent to conditions in other ones of the plurality of rules, certain ones of the plurality of rules having sequences of conditions and logical connectors that are equivalent to sequences of conditions and logical connectors in other ones of the plurality of the rules, each of the conditions in a rule being represented by a test node and each of the logical connectors being represented by a join node in the RETE network, each join node having node memory associated therewith, the test and join nodes being arranged to determine the satisfaction of the conditions and operation of the logical connectors as represented by the nodes, the nodes also being coupled together to represent the sequence of conditions and logical connectors of the rules of the target expert system, the functions each of the nodes capable of being performed on one on the multiple processors of the computer system, the method for building a RETE network comprising the steps of:

a. storing the target expert system in a memory;

b. storing in the memory a set of testing data elements for use in determining the satisfaction of the conditions of the rules;

c. utilizing the target expert system in the memory to create a testing RETE network from the stored target expert system, the RETE network comprising a set of test nodes and join nodes representing the conditions and logical connectors in the rules of the target expert system arranged such that shared sequences of conditions and logical connectors are represented only once;

d. generating processing statistics for each join node of the testing RETE network by applying the set of testing data elements to the RETE network;

e. providing a neural network with programming data so that the neural network can be programmed to generate indicators identifying nodes in the target expert system for beta-token partitioning based on processing statistics;

f. generating indicators for beta-token partitioning by applying the target expert system and processing statistics to the programmed neural network;

g. allocating the nodes and the node memory associated with the join nodes of the testing RETE network to partitions based on indicators generated by the neural network, each partition representing one of the multiple processors; and h. converting the rules of the target expert system into a computer-executable RETE network, according to the partitions, each partition of the RETE network being arranged to execute on a corresponding one of the multiple processors.

13. The method for building a RETE network of claim 12 wherein the step of providing the neural network with programming data further comprises the steps of:

i. storing at least one training expert system program in a training memory, ii. storing a set of testing training data elements for use in determining the satisfaction of the conditions of the rules in the training memory, iii. utilizing the training expert system in the training memory to create a testing training RETE network from the stored expert system, the testing training RETE network comprising a set of test nodes and join nodes representing the conditions and logical connectors in the rules of the training expert system arranged such that shared sequences of conditions and logical connectors are represented only once;

iv. generating training processing statistics for each join node of the testing training RETE network by applying the set of testing data elements to the testing training RETE network;

v. generating training indicators of nodes of the testing training RETE network at which beta-token partitioning should take place; and vi. providing the neural network with the training indicators and training processing statistics.

14. The method for building a RETE network of claim 13 wherein the step of generating the training indicators further comprises the step of generating the training indicators as a function of the training processing statistics.

15. The method for building a RETE network of claim 13 wherein the step of generating training indicators further comprises the steps of:

a. producing system indicators as a function of the training processing statistics that indicate the nodes of the testing training RETE network at which beta-token partitioning should take place; and b. using genetic variation analysis to produce training indicators as functions of the system indicators.

16. The method for building a RETE network of claim 15 wherein the step of using genetic variation analysis to produce training indicators includes the steps of:

i. using genetic variation analysis to generate additional partitioning indicators as a function of system indicators for different nodes at which beta-token partitioning should take place;

ii. producing variation RETE networks partitioned as indicated by the system indicators and the additional partitioning indicators;

iii. executing the variation RETE networks;

iv. collecting execution statistics on the execution of the variation RETE networks; and v. generating training indicators as a function of the execution statistics.

* * * * *